(12) United States Patent
Park

(10) Patent No.: US 6,298,408 B1
(45) Date of Patent: Oct. 2, 2001

(54) INTELLIGENT INPUT AND OUTPUT CONTROLLER FOR FLEXIBLE INTERFACE

(75) Inventor: Seung-Kwon Park, Sungnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/261,392

(22) Filed: Mar. 3, 1999

(30) Foreign Application Priority Data

Mar. 3, 1998 (KR) .................................................. 98-6852

(51) Int. Cl.⁷ .................................................. G06F 13/00
(52) U.S. Cl. .................................................. 710/129; 710/64
(58) Field of Search .................................................. 710/64, 129

(56) References Cited

U.S. PATENT DOCUMENTS

| | | | |
|---|---|---|---|
| 4,750,113 | * 6/1988 | Buggert | 710/64 |
| 5,274,765 | * 12/1993 | Gallo | 710/64 |
| 5,592,682 | 1/1997 | Chejlava, Jr. et al. . | |
| 5,644,790 | * 7/1997 | Li et al. | 710/63 |
| 5,655,145 | 8/1997 | Chejlava, Jr. et al. . | |
| 5,689,732 | * 11/1997 | Kondo | 710/64 |
| 5,748,921 | 5/1998 | Lambrecht et al. . | |
| 5,778,197 | 7/1998 | Dunham . | |
| 5,787,306 | 7/1998 | Michael . | |
| 5,799,203 | * 8/1998 | Lee et al. . | |
| 5,815,679 | * 9/1998 | Liu | 710/129 |
| 5,838,935 | 11/1998 | Davis et al. . | |
| 5,848,249 | 12/1998 | Garbus et al. . | |
| 5,857,083 | 1/1999 | Venkat . | |
| 5,938,740 | * 8/1999 | Chang | 710/5 |
| 6,094,699 | * 7/2000 | Surugucchi et al. | 710/128 |
| 6,134,613 | * 10/2000 | Stephenson et al. | 710/102 |

\* cited by examiner

Primary Examiner—Paul R. Myers
(74) Attorney, Agent, or Firm—Robert E. Bushnell, Esq.

(57) ABSTRACT

An intelligent input and output controller for flexible interface is disclosed. The present invention is comprised of a basic module for common use, input and output device interface modules for exclusive functions according to the input and output devices, and Peripheral Component Interconnect (PCI) bus connecting the basic module and the input and output device interface modules. The intelligent input and output controller is divided into a basic module and input and output device interface modules, thereby, utilizing, when developing a new input and output controller, the existing hardware to the maximum.

21 Claims, 9 Drawing Sheets

FIG. 10

| PIN | SIGNAL | PIN | SIGNAL | PIN | SIGNAL | PIN | SIGNAL |
|---|---|---|---|---|---|---|---|
| 1 | S_TRST | 31 | S_AD18 | 61 | -12V | 91 | +3.3V |
| 2 | +12V | 32 | S_AD16 | 62 | S_TCK | 92 | S_AD17 |
| 3 | S_TMS | 33 | +3.3V | 63 | GND | 93 | S_C/BE2# |
| 4 | S_TDI | 34 | S_FRANE# | 64 | S_TDO | 94 | GND |
| 5 | +5V | 35 | GND | 65 | +5V | 95 | S_IRDY# |
| 6 | X_INT3# | 36 | S_TRDY# | 66 | +5V | 96 | +3.3V |
| 7 | X_INT5# | 37 | GND | 67 | X_INT4# | 97 | S_DEVSEL# |
| 8 | +5 | 38 | S_STOP# | 68 | X_INT6# | 98 | GND |
| 9 | CLK_C | 39 | +3.3V | 69 | S_REQ5# | 99 | S_LOCK# |
| 10 | +5 | 40 | GP100 | 70 | S_REQ3# | 100 | S_PERR# |
| 11 | CLK_D | 41 | N.C | 71 | S_GNT5# | 101 | +3.3V |
| 12 | GND | 42 | GND | 72 | GND | 102 | S_SERR# |
| 13 | GND | 43 | S_PAR | 73 | GND | 103 | +3.3V |
| 14 | S_GNT3# | 44 | S_AD15 | 74 | CLK_A | 104 | S_C/BE1# |
| 15 | S_RST# | 45 | +3.3V | 75 | GND | 105 | S_AD14 |
| 16 | +5V | 46 | S_AD13 | 76 | CLK_B | 106 | GND |
| 17 | S_GNT2# | 47 | S_AD11 | 77 | GND | 107 | S_AD12 |
| 18 | GND | 48 | GND | 78 | S_REQ2# | 108 | S_AD10 |
| 19 | S_REQ4# | 49 | S_AD9 | 79 | +5V | 109 | GND |
| 20 | S_AD30 | 50 | S_C/BE0# | 80 | S_AD31 | 110 | S_AD8 |
| 21 | +3.3V | 51 | +3.3V | 81 | S_AD29 | 111 | S_AD7 |
| 22 | S_AD28 | 52 | S_AD6 | 82 | GND | 112 | +3.3V |
| 23 | S_AD26 | 53 | S_AD4 | 83 | S_AD27 | 113 | S_AD5 |
| 24 | GND | 54 | GND | 84 | S_AD25 | 114 | S_AD3 |
| 25 | S_AD24 | 55 | S_AD2 | 85 | +3.3V | 115 | GND |
| 26 | S_GNT4# | 56 | S_AD0 | 86 | S_C/BE3# | 116 | S_AD1 |
| 27 | +3.3V | 57 | +5V | 87 | S_AD23 | 117 | +5V |
| 28 | S_AD22 | 58 | GP101 | 88 | GND | 118 | GP102 |
| 29 | S_AD20 | 59 | +5V | 89 | S_AD21 | 119 | +5V |
| 30 | GND | 60 | +5V | 90 | S_AD19 | 120 | +5V |

INTELLIGENT INPUT AND OUTPUT CONTROLLER FOR FLEXIBLE INTERFACE

CLAIM OF PRIORITY

This application makes reference to, incorporates the same herein, and claims all benefits accruing under 35 U.S.C. §119 from an application entitled AN INTELLIGENT INPUT/OUTPUT CONTROLLER FOR INTERFACE FUNCTION SWITCHING earlier filed in the Korean Industrial Property Office on the $3^{rd}$ day of March 1998, and there duly assigned Serial No. 98-6852, a copy of which is annexed hereto.

BACKGROUND OF THE INVENTION

1. Technical Field

The present invention relates to the field of use of computer system architecture. More particularly, the present invention relates to a Peripheral Component Interconnect (PCI) bus and an intelligent input/output controller and associated implementation methods pertaining to computer systems.

2. Related Art

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together. A computer system can be a desktop computer, a portable computer such as a notebook computer or palm-sized computer, or other type of computer.

The central processing unit is often described as a microprocessor. The microprocessor is an electronic component having internal logic circuitry handling most, if not all, the data processing in the computer system. The internal logic circuitry of microprocessors is typically divided into three functional parts known as the input/output (I/O) unit, the control unit, and the arithmetic-logic unit (ALU). These three functional parts interact together and determine the power and performance of the microprocessor. The combination of the control unit and the arithmetic-logic unit can be referred to as the central processing unit. Also, the combination of the input/output unit, the control unit, and the arithmetic-logic unit can be referred to as the central processing unit.

One example of non-volatile memory is read only memory (ROM). Information stored in non-volatile memory can remain unchanged even when there is a power failure. The information stored in non-volatile memory will stay there until it is changed. Read only memory is used to store important information such as instructions for the central processing unit. There are different types of read only memory including electrically-erasable-programmable-read-only-memory (EEPROM) chip and flash-read-only-memory (flash-ROM). The flash-ROM can also be referred to as flash memory.

Computer systems include a basic input output system (BIOS) which is an especially important program stored in read only memory. The basic input output system tests a computer every time the computer is powered on. The basic input output system can allocate a computer system's resources automatically, making adjustments needed to accommodate new hardware. Also, the basic input output system governs how system board components interact.

When the computer system is powered on, the basic input output system immediately takes control of the computer system and its components. The first duty of the basic input output system is to perform a series of diagnostic routines called the power on self test (POST) routine, which ensures that every part of the computer system's hardware is functioning properly.

An "intelligent" controller can be described as a device controller provided with local interpreting functions. For example, the local interpreting functions could include editing, input validity checks, and complex command decoding. "Intelligent" instruments can include devices that are provided with capabilities that cause them to be superior to instruments that merely sense and display analog information. More particularly, a variety of "intelligence" levels can be shown pertaining to "intelligent" instruments. For example, an instrument characterized as having a low intelligence level could be equipped with a first ability to sense and display information in combination with a second ability to convert analog information into digital information. An instrument characterized as having an intermediate intelligence level could be equipped with an ability to mathematically manipulate digital data. An instrument characterized as having a higher intelligence level could be equipped with a first ability to interpret results of mathematical manipulation in combination with a second ability to make decisions based on the interpretation of the results.

Presently, computer systems employ a wide variety of peripheral components or input/output (I/O) devices. An example can be seen where the host processor of the computer system is connected to input/output devices through a component bus defined by the Peripheral Component Interconnect (PCI) Local Bus Specification, Revision 2.0, published by the PCI Special Interest Group. The PCI Special Interest Group can be reached at 2575 NE Kathryn St. #17, Hillsboro, Oreg. 97124. During system initialization, the host processor loads a device driver for each PCI device on the PCI bus. During operation, the PCI bus is occupied each time a read or write transaction is occurring. The part of the host processor's processing time that is used in processing the interrupts generated by each PCI device is taken away from the total processing time of the host processor.

I have found that an input/output controller for a PCI bus could be modified to be improved. Efforts have been made to improve input/output control, buses, and devices coupled to buses.

Exemplars of recent efforts in the art include U.S. Pat. No. 5,857,083 for BUS INTERFACING DEVICE FOR INTERFACING A SECONDARY PERIPHERAL BUS WITH A SYSTEM HAVING HOST CPU AND A PRIMARY PERIPHERAL BUS issued to Venkat, U.S. Pat. No. 5,848,249 for METHOD AND APPARATUS FOR ENABLING INTELLIGENT I/O SUBSYSTEMS USING PCI I/O DEVICES issued to Garbus U.S. Pat. No. 5,838,935 for METHOD AND APPARATUS PROVIDING PROGRAMMABLE DECODE MODES FOR SECONDARY PCI BUS INTERFACES issued to Davis et al., U.S. Pat. No. 5,787,306 for AUTOMATIC ASSIGNMENT OF I/O ADDRESSES IN A COMPUTER SYSTEM issued to Michael, U.S. Pat. No. 5,778,197 for METHOD FOR ALLOCATING SYSTEM RESOURCES IN A HIERAR- CHICAL BUS STRUCTURE issued to Dunham, U.S. Pat. No. 5,748,921 for COMPUTER SYSTEM INCLUDING A PLURALITY OF MULTIMEDIA DEVICES EACH HAVING A HIGH-SPEED MEMORY DATA CHANNEL FOR ACCESSING SYSTEM MEMORY issued to Lambrecht et al., U.S. Pat. No. 5,655,145 for PERIPHERAL INTERFACE CIRCUIT WHICH SNOOPS COMMANDS TO DETERMINE WHEN TO PERFORM DMA PROTOCOL TRANSLATION issued to Chejlave, Jr. et al. and U.S. Pat. No. 5,592,682 for INTERFACE CIRCUIT FOR TRANSFERRING DATA BETWEEN HOST DEVICE AND MASS STORAGE DEVICE IN RESPONSE TO DESIGNATED ADDRESS IN HOST MEMORY SPACE ASSIGNED AS DATA PORT issued to Chejlava, Jr. et al.

While these recent efforts provide advantages, I note that they fail to adequately provide an efficient and improved intelligent input/output controller for a PCI bus.

SUMMARY OF THE INVENTION

It is an object of the present invention to divide the intelligent I/O controller hardware into the following two modules: a basic module and a special I/O interface module. The basic module can be commonly applied to any I/O controllers. However, the special I/O interface module is for a particular I/O device controller. The aforementioned two modules are connected to one another.

In other words, it is an object of the present invention to divide the hardware of the intelligent input and output controller into a common input and output controller part and a specific input and output controller part, thereby, when implementing an intelligent input and output controller of a new input and output devices, the prior same common part is used again and the specific input and output device controller part is only developed.

In one aspect of the present invention, an intelligent input and output controller for flexible interface comprises: basic module for common use; input and output device interface modules for exclusive functions according to the input and output devices; and Peripheral Component Interconnect (PCI) bus, connecting the basic module and the input and output device interface modules.

The basic module comprises: device performing the intelligent tasks; host input and output bus interface block connecting with the main system; modified PCI interface block connecting with the input and output device interface modules; and input and output controller for implementing any functions by the designer through the modified PCI interface block.

The device performing the intelligent tasks comprises: processor performing intelligent input and output tasks; memory for the processor; interrupt controller for the processor; and timer for the processor. The basic module and the modified PCI interface block are connected based on the piggy back pattern. The modified PCI interface block keeps the specification of the standard PCI bus, and additional functions may be added by the user's definition.

The modified PCI interface block comprises: PCI bus interface block keeping the mechanical specification of the piggy back pattern and the protocol specification of the standard PCI bus and having an additional signal line which can be modified by the user's definition; and connector connecting the PCI bus interface block and the input and output device interface module. The input and output controller is comprised of programmable gate arrays, thereby having no need of modifying the hardware.

In the input and output controller, according to the input and output device interface modules, necessary functions can be implemented to the modified PCI interface block. The input and output device interface modules comprises: PCI interface block matching the modified PCI interface block of the basic module; input and output device controller, connected with the PCI interface block, controlling the input and output devices; and input and output interface block matching the input and output device controller and the input and output devices.

When the system matches the fast ethernet, the input and output device interface module, implemented as the pattern of fast ethernet interface module, matches the fast ethernet. When the system matches the optical channels, the input and output device interface module, implemented as the pattern of optical channels interface module, matches the optical channels. When the system matches the storage devices, the input and output device interface module, implemented as the pattern of storage device interface module, matches the storage device.

The PCI bus keeps the mechanical specification of the piggy back pattern and the protocol specification of the standard PCI bus and has an additional signal line which can be modified by the user's definition.

To achieve these and other objects in accordance with the principles of the present invention, as embodied and broadly described, the present invention provides an apparatus, comprising: a control unit being coupled to a host computer system, said control unit controlling signals input to and output from said host computer system, said control unit further comprising: a primary interface unit being coupled to said host computer system and performing primary input/output control operations; a plurality of secondary interface units, each one of said secondary interface units being coupled to a respective peripheral unit selected from among a plurality of peripheral units and performing particular input/output control operations and additional control operations corresponding exclusively to said respective peripheral unit; and a Peripheral Component Interconnect bus unit coupling said primary interface unit with said plurality of secondary interface units.

To achieve these and other objects in accordance with the principles of the present invention, as embodied and broadly described, the present invention provides an apparatus, comprising: a control unit being coupled to a host computer system, said control unit controlling signals input to and output from said host computer system, said control unit further comprising: a primary interface unit being coupled to said host computer system and performing primary input/output control operations; a plurality of secondary interface units including a first secondary interface unit, said first secondary interface unit being coupled to a first peripheral unit selected from among a plurality of peripheral units, said first secondary interface unit performing particular input/output control operations and additional control operations corresponding exclusively to said first peripheral unit; and a Peripheral Component Interconnect bus unit coupling said primary interface unit with said plurality of secondary interface units.

To achieve these and other objects in accordance with the principles of the present invention, as embodied and broadly described, the present invention provides an apparatus, comprising: a control unit being coupled to a host computer system, said control unit controlling signals input to and output from said host computer system, said control unit further comprising: a primary interface unit being coupled to said host computer system and performing primary input/output control operations; a first secondary interface unit performing first particular input/output control operations and first additional control operations, said first secondary interface unit being removably connected to at least one peripheral unit, said first particular input/output control operations and first additional control operations corresponding exclusively to said at least one peripheral unit; and a Peripheral Component Interconnect bus unit removably coupling said primary interface unit with said first secondary interface unit.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIG. 10 illustrates a table of the pins and their assigned names of the connector, in accordance with the principles of the present invention.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

The fast computer systems utilize frequently an intelligent input and output controller in order to decrease the overload of the system's CPU when the CPU performs the tasks relating to the input and output of the signals.

Figure 1:
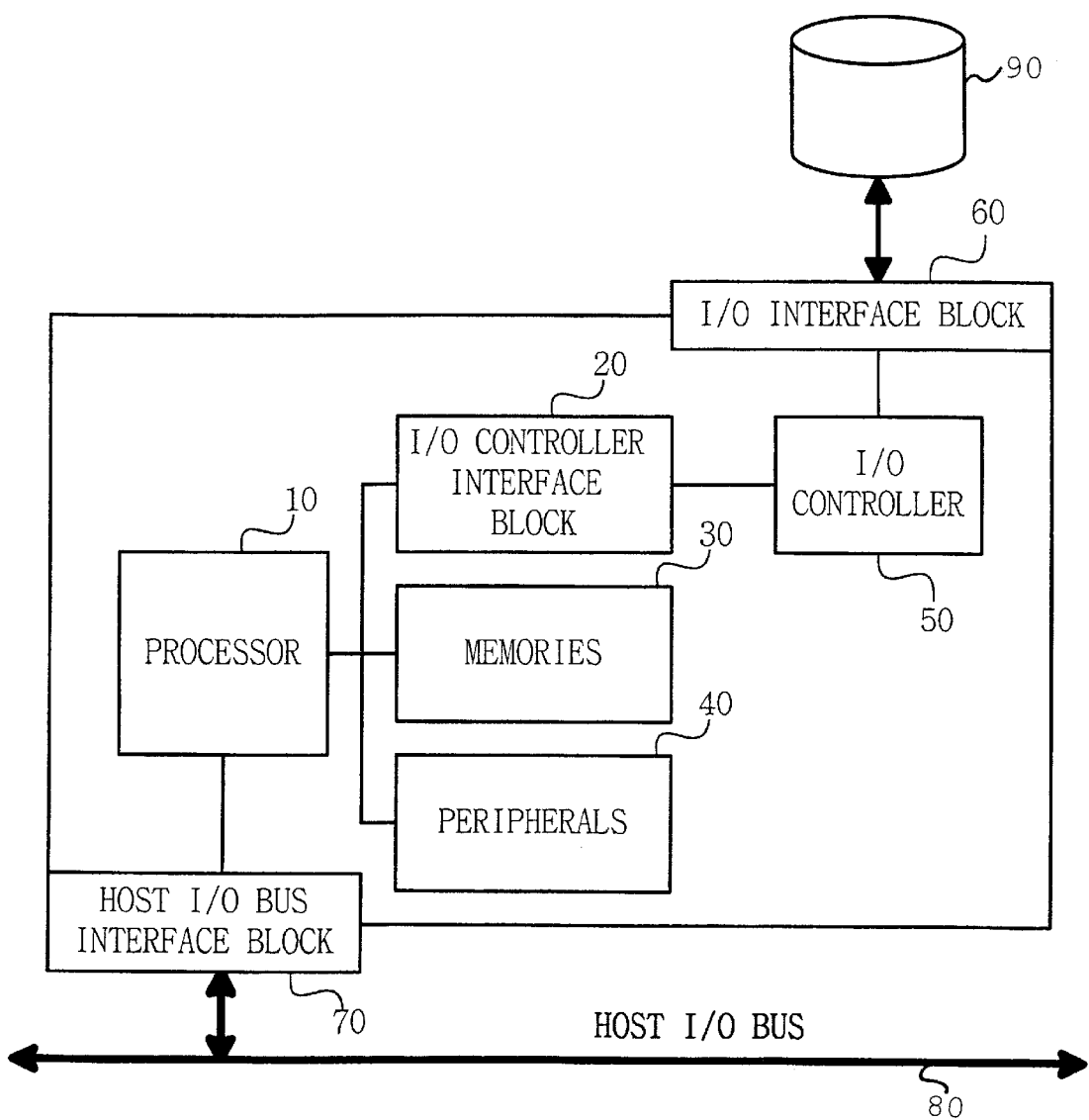
FIG. 1 illustrates a schematic diagram of an input and output controller.

Turn now to FIG. 1, which illustrates a schematic diagram of an input and output (I/O) controller. As illustrated in FIG. 1, the I/O controller is comprised of: a processor 10 only performing the input and output tasks; a memory 30 providing the working environments of the processor 10; peripherals 40; an input and output controller 50 controlling the input and output devices; an input and output controller interface block 20; an input/output interface block 60; a host input/output bus interface block 70; a host I/O bus 80; and a unit 90 coupled to I/O interface block 60. FIG. 1 shows an exclusive input and output controller having a specific input and output interface block within.

When using the system of FIG. 1, additional functions for controlling the new input and output devices may be needed. But in case the above-noted input and output controller of FIG. 1, though the system has identical specification of the design except the hardware relating to the input and output device controller, the whole system must be newly developed. This increases the total design cost and the time to develop the system.

Figure 2:
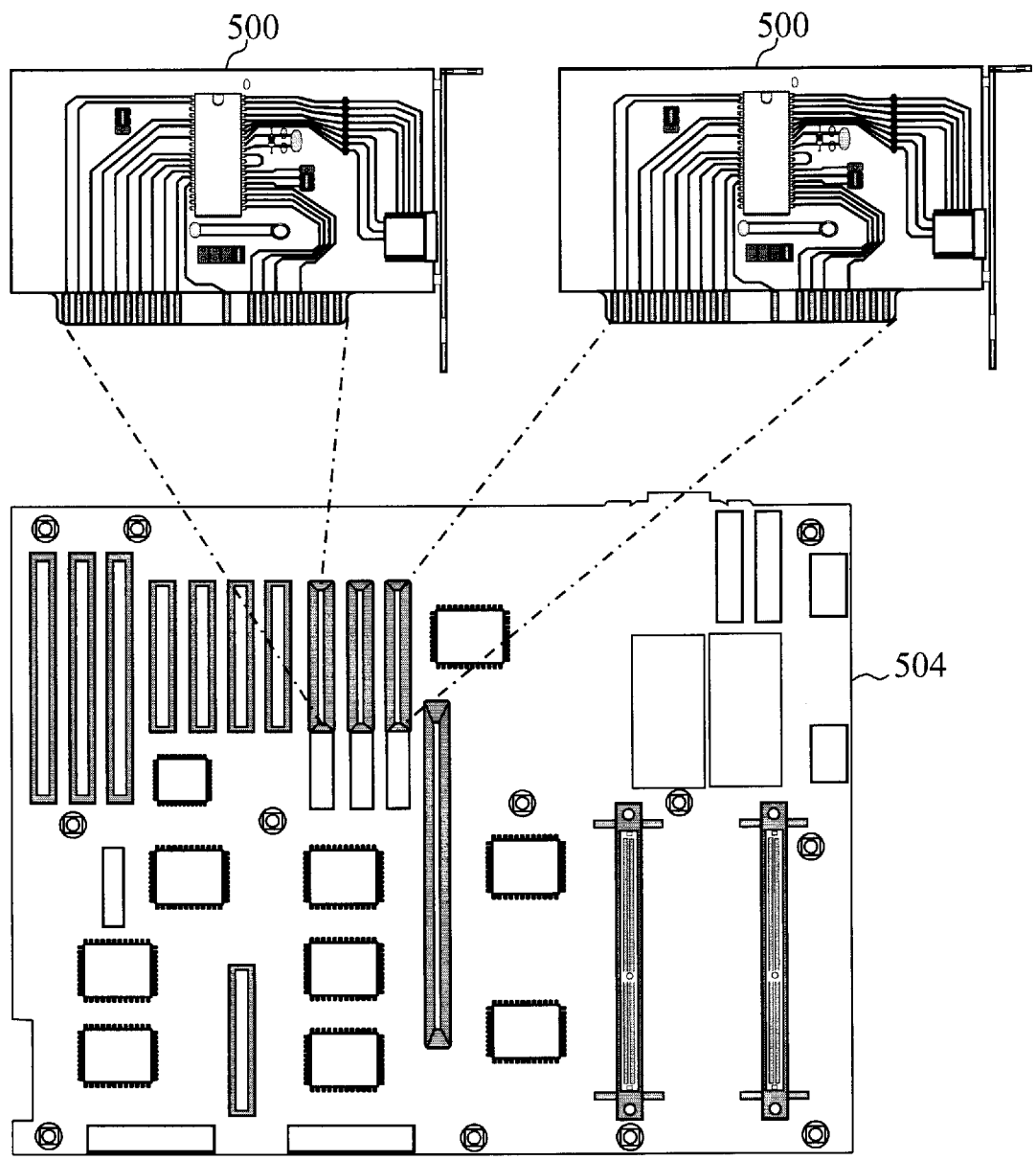
FIG. 2 illustrates a schematic diagram of a Peripheral Component Interconnect (PCI) input and output bus controller.

The PCI is a standard input and output bus adopted as the input and output bus by the most computer systems. Turn now to FIG. 2, which illustrates a schematic diagram of a PCI input and output bus controller. As illustrated in FIG. 2, it is connected to the main board as a connector type, and the input and output controllers having the edge connector interface block is vertically inserted to the main board. FIG. 2 illustrates two PCI cards being inserted into a back-plane board. That is, FIG. 2 shows a system having a structure which is different from a piggy back pattern structure. The components 500 and 502 are PCI cards and the component 504 is a back-plane board.

The PCI bus does not provide a hardware connection mechanism of the piggy back type which is used when developing the general hardware boards. And because it is a standard bus, when developing the hardware by the use of the PCI bus, the designer cannot implement the designer's desired functions between the hardware modules connected through the PCI bus.

Figure 7:
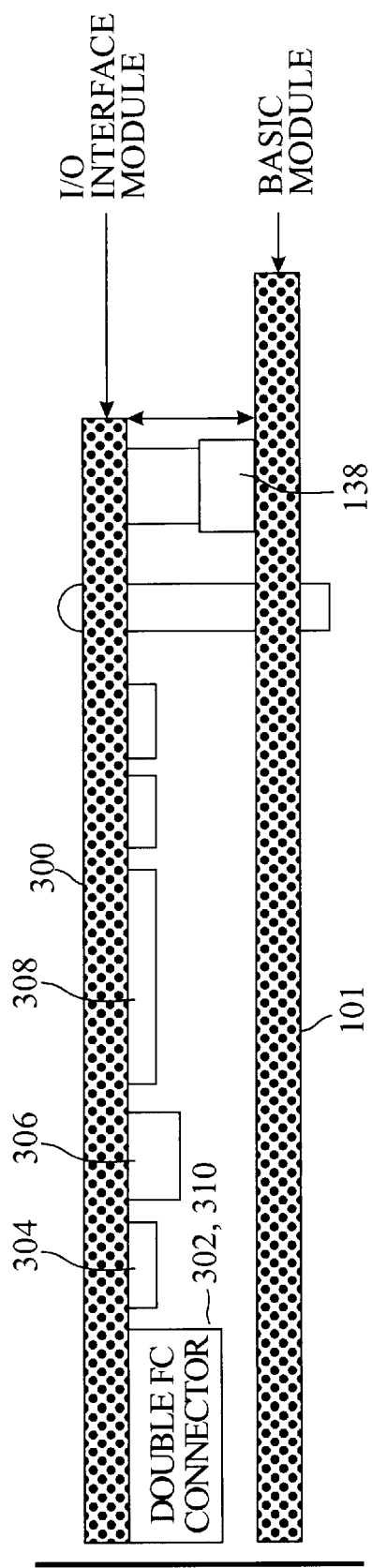
FIG. 7 illustrates a schematic diagram of the combined form of the basic module and the input and output interface module, in accordance with the principles of the present invention.

The piggy back pattern can be described with reference to FIG. 7. As illustrated in FIG. 7, when two modules, for example 101 and 300 of FIG. 7, are inserted into a connector in parallel, the two modules are said to have the piggy back pattern structure. Normally the modules are inserted into the back-plane module vertically, but the modules with the piggy back pattern structure are inserted into the module parallel to the back-plane module so that the modules with the piggy back pattern structure and the back-plane module face each other.

The present invention relates to a design of an intelligent input and output controller used in general computer systems. When a new input and output controller is needed, a previously developed common part of the hardware having the identical design specification is re-used, thereby, easily implementing a new input and output controller.

That is, the intelligent input and output controller hardware is divided into the following two modules: (1) a basic module and (2) an I/O interface module. The basic module can be commonly applied to any input and output controllers. However, the I/O (input and output) interface module is for a particular input and output device controller. The connection between the two modules is piggy back type, to be handled as a hardware board. And the PCI bus, an industry standard, is utilized so as to develop the hardware modules with ease. When it is said that the basic module can be commonly applied to any input and output controllers, what is meant is that the basic module is in common use and can contain the hardware elements which are used in all kinds of I/O devices commonly.

Specifically, in order to implement the additional functions which may be needed to input and output device controls, a common signal is appended to the modified PCI bus of the present invention, and by the common signal a designer may implement the designer's desired function. This common signal is connected to the input and output controller, a programmable hardware in the basic module, thereby enabling the designer to implement his desired functions.

Figure 3:
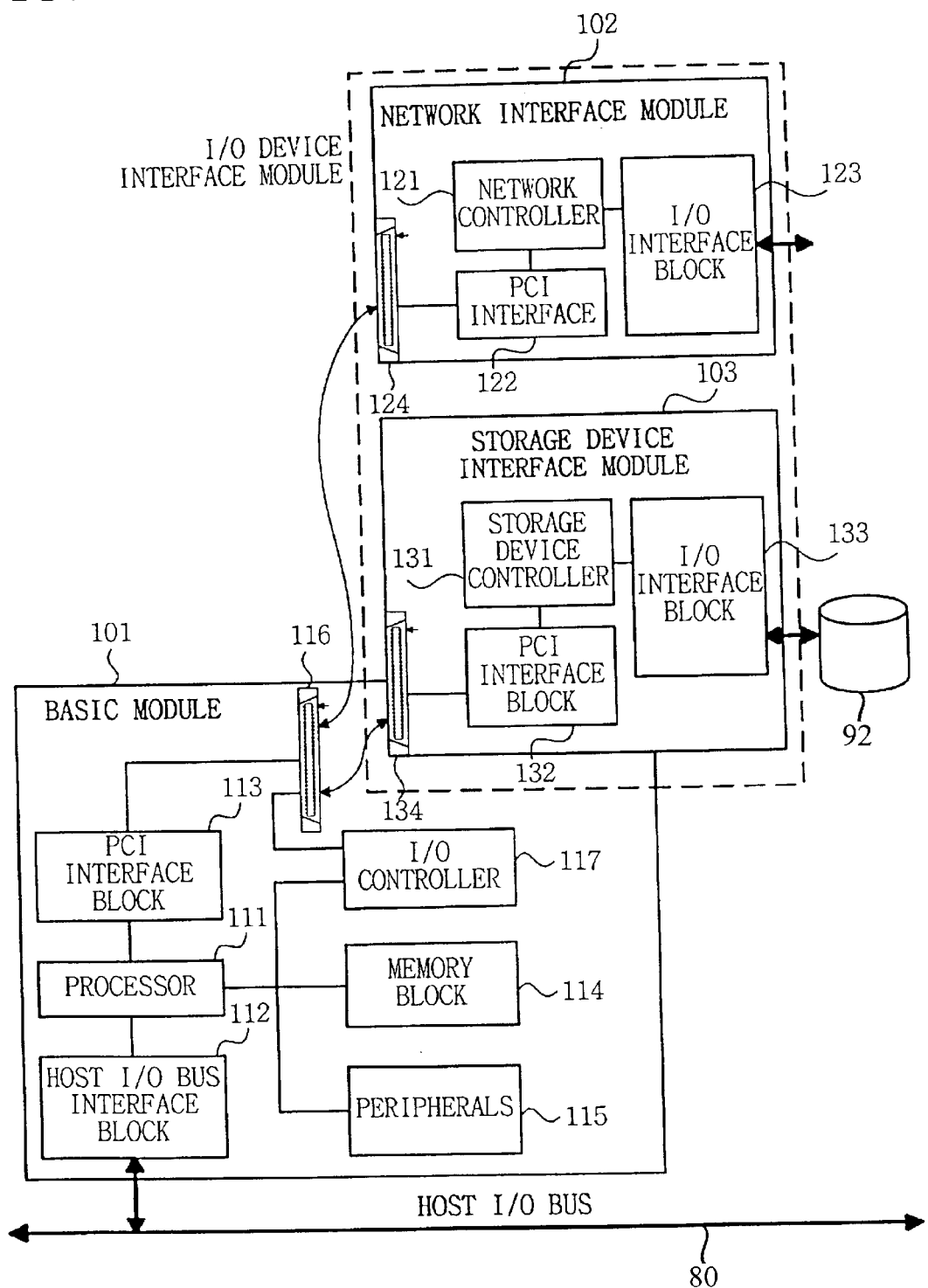
FIG. 3 illustrates a schematic diagram of an intelligent input and output controller, in accordance with the principles of the present invention.

Turn now to FIG. 3, which illustrates a schematic diagram of an intelligent input and output controller, in accordance with the principles of the present invention. The intelligent input and output controller according to the present inventionas shown in FIG. 3, comprises the basic module 101, a first input and output device interface module 102, and a second input and output device interface module 103. FIG. 3 shows a network interface module 102 and a storage device interface module 103 in order to display a configuration example of various input and output interface modules.

The input and output device interface module is connected to a particular input and output device. The matching of the basic module 101 and the network interface module 102 is a configuration example of the intelligent disk controller.

The basic module 101 is comprised of: a processor 111 programmed for the intelligent tasks; a memory block 114; peripherals 115; host input and output bus interface block 112; the connector 116 in combination with the PCI interface block 113 for the connection with the input and output device interface modules 102 and 103; and the input and output controller 117 implementing the designer's desired functions through the modified PCI. The host I/O bus 80 is also shown. The input and output device interface module 103 is shown coupled with a storage unit 92.

The "intelligent tasks" performed by the processor 111 can include I/O tasks based on a plurality of I/O requests associated with the multi-tasks of a computer system, wherein those I/O tasks would normally be processed by the CPU of the host computer system. However, to reduce the load on the CPU, the processor 111 of the I/O controller 117 processes some of the I/O tasks associated with a plurality of I/O requests. Such a processor is called an intelligent processor and the tasks performed by intelligent processors are called intelligent input and output tasks.

Referring to FIG. 3, the basic module 101 includes: the processor 111 performing the input and output tasks, and the environments for the processor's working. Memories 114 and the peripherals 115, such as an interrupt controller and a timer, are needed in order to make the processor 111 act. And the basic module 101 also includes: the host input and output bus interface block 112 connecting the input and output controller with the main system; the modified PCI interface block 113 for the connection with the input and output device interface block; and the input and output controller 117 enabling the designer to implement his desired functions through the modified PCI interface block 113.

The modified PCI interface block can be a chip mounted onto the basic module using solder. This mounting can be done using the piggy back pattern structure.

By utilizing the programmable hardware, that is, the Field Programmable Gate Array (FPGA), the input and output controller 117 can perform necessary functions relating to the input and output device interface module without modifying the hardware. In other words, the hardware does not need to be physically removed from the host computer system or swapped out. Instead, the hardware can simply be reprogrammed. The FPGA is a type of an application specific integrated circuit (ASIC) which is able to be used to freely program several application circuits. A user can embody the desired functions using the FPGA.

In FIG. 3, the input and output device interface module 102 includes network controller 121, PCI interface 122, connector 124, and I/O interface block 123. The input and output device interface module 103 includes storage device controller 131, connector 134, PCI interface block 132, and I/O interface block 133. The number of I/O device interface modules which can be simultaneously connected to a basic module using the "piggy back pattern" is one, because a basic module is mapped onto an I/O device interface module. The two I/O device interface modules 102 and 103 are not connected to the basic module 101 simultaneously using a piggy back pattern.

Figure 4:
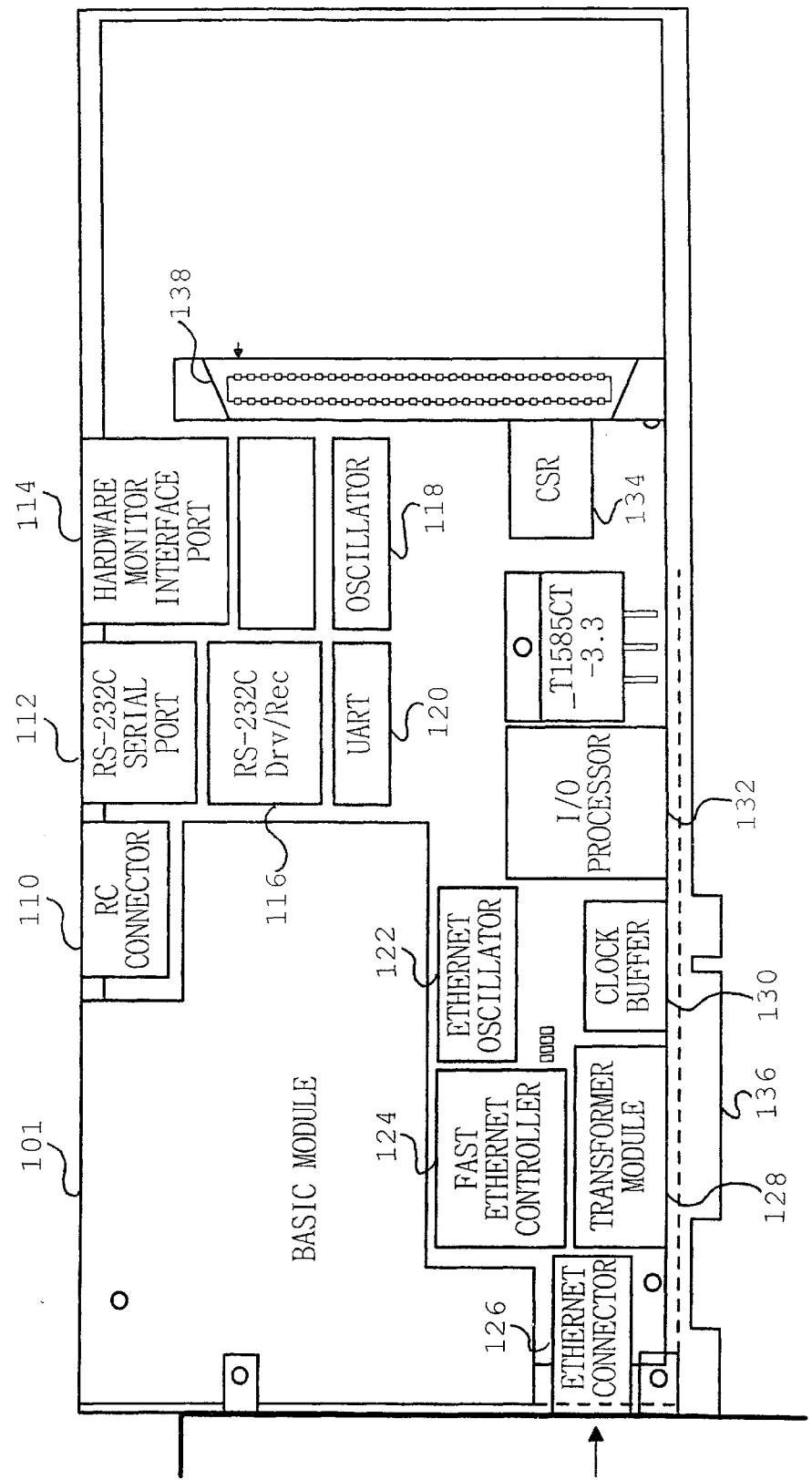
FIG. 4 illustrates a physical display of the basic module, in accordance with the principles of the present invention.

Turn now to FIG. 4, which illustrates a physical display of the basic module, in accordance with the principles of the present invention. FIG. 4 illustrates a physical display of the basic module 101 according to the present invention. FIG. 4 shows an RC connector 110, an RS-232C serial port 112, a hardware monitor interface port 114, an RS-232C Drv/Rec 116, an oscillator 118, a universal asynchronous receiver/transmitter (UART) 120, an ethernet oscillator 122, a fast ethernet controller 124, an ethernet connector 126, a transformer module 128, a clock buffer 130, an I/O processor 132, a CSR 134, a first connector 136, and a second connector 138. The first connector 136 is an edge connector on the basic module 101 allowing the basic module 101 to be coupled with a main board of a computer system.

Figure 5:
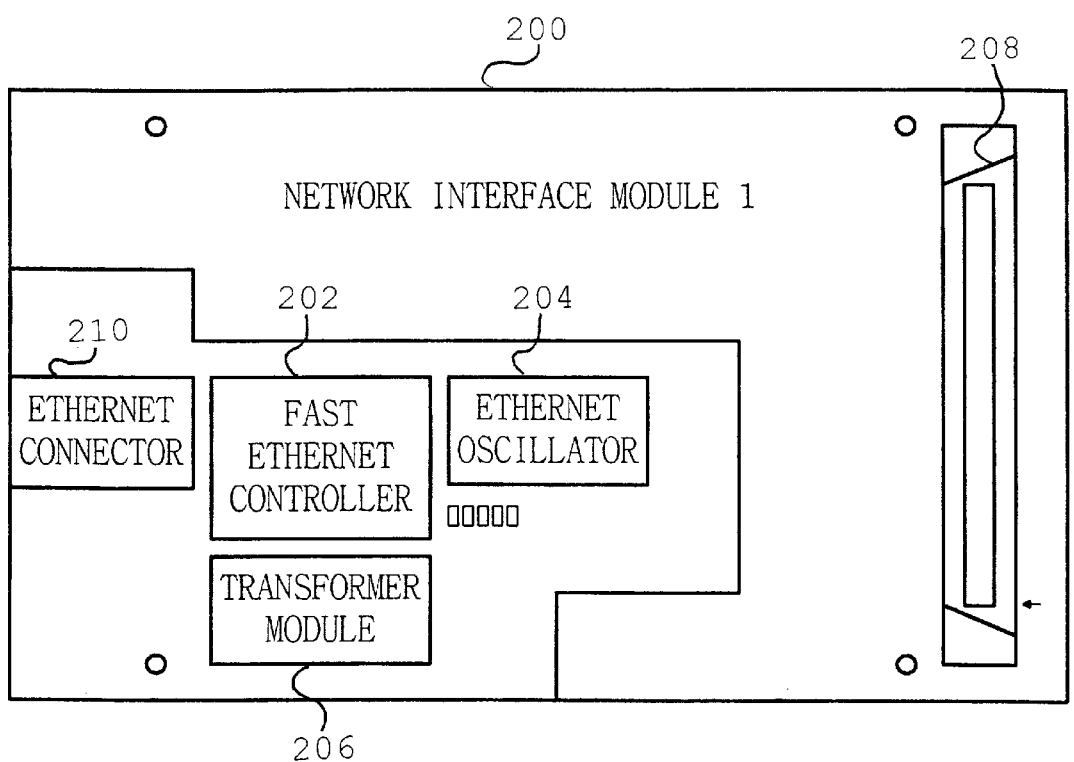
FIG. 5 illustrates a physical display of a first input and output device interface module, in accordance with the principles of the present invention.

Turn now to FIG. 5, which illustrates a physical display of a first input and output device interface module, in accordance with the principles of the present invention. FIG. 5 shows a physical display of a fast ethernet interface module according to the present invention. FIG. 5 shows network interface module 1 (200), ethernet connector 210, fast ethernet controller 202, ethernet oscillator 204, transformer module 206, and connector 208. Note that the present invention can support a standard ethernet networking unit and not only the fast ethernet networking unit shown in FIG. 5. Other networking units are also within the scope of the present invention.

Figure 6:
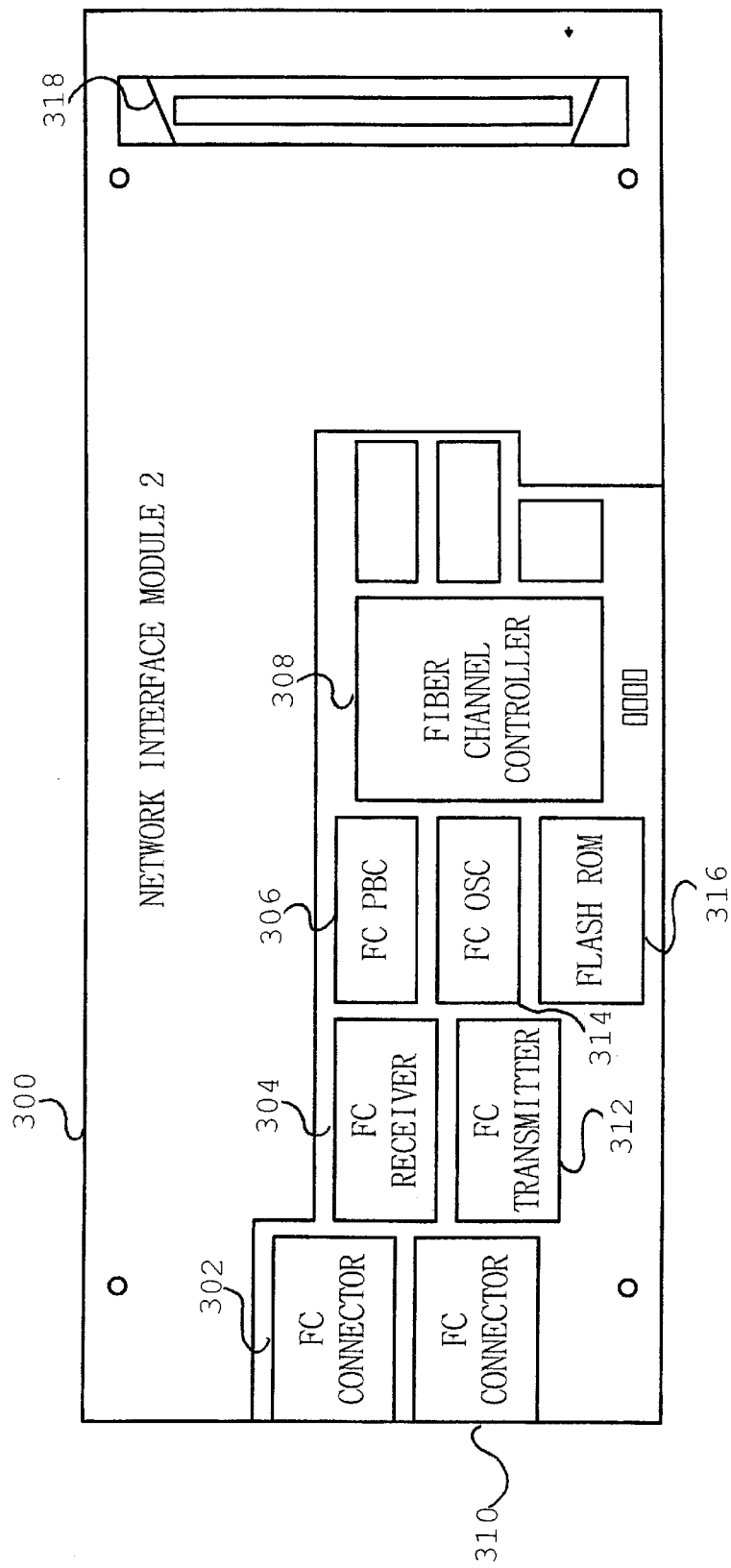
FIG. 6 illustrates a physical display of a second input and output device interface module, in accordance with the principles of the present invention.

Turn now to FIG. 6, which illustrates a physical display of a second input and output device interface module, in accordance with the principles of the present invention. FIG. 6 shows a physical display of an optical fiber channel (FC) interface module according to the present invention. FIG. 6 shows network interface module 2 (300), first FC connector 302, FC receiver 304, FC PBC 306, fiber channel controller 308, second FC connector 310, FC transmitter 312, FC OSC 314, flash ROM (read only memory) 316, and connector 318.

Turn now to FIG. 7, which illustrates a schematic diagram of the combined form of the basic, module and the input and output interface module, in accordance with the principles of the present invention. FIG. 7 shows a combined form of the basic module 101 and the input and output interface module 300. The basic module 101 of FIG. 7 corresponds to the basic module 101 of FIG. 4, having connector 138. The I/O interface module 300 of FIG. 7 corresponds to the optical fiber channel interface module 300 of FIG. 6, having connector 318.

Figure 8:
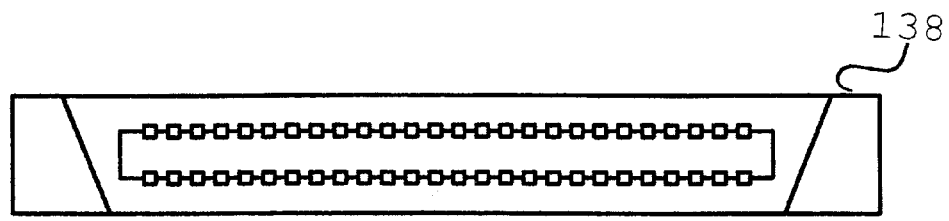
FIG. 8 illustrates a form of the connector used in the present invention, in accordance with the principles of the present invention.
Figure 9:
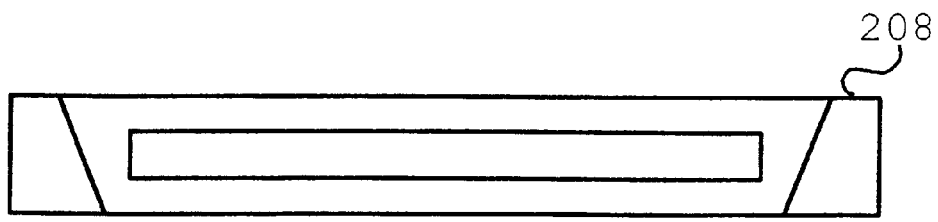
FIG. 9 illustrates another form of the connector used in the present invention, in accordance with the principles of the present invention.

Turn now to FIG. 8, which illustrates a form of the connector used in the present invention, in accordance with the principles of the present invention. FIG. 8 illustrates a form of the connector 138 equipped into the basic module. Turn now to FIG. 9, which illustrates another form of the connector used in the present invention, in accordance with the principles of the present invention. FIG. 9 illustrates a form of the connector 208 equipped into the input and output device interface module. The connector 208 of FIG. 9 is male and the connector 138 of FIG. 8 is female, and these two connectors are fitted together by making the male connector insert into the female connector (refer also to FIG. 7).

Turn now to FIG. 10, which illustrates a table of the pins and their assigned names of the connector, in accordance with the principles of the present invention. FIG. 10 illustrates the pins and their assigned names of the connector according to the present invention. GP10[0:2] of the pin numbers 40, 58, and 118 are connected to the input and output controller of the basic module and are common use signals for the designer to implement his desired functions. The remaining signals keep the specifications of the standard PCI bus.

In accordance with the principles of the present invention, an interface module (such as module 102 shown in FIG. 3) can correspond to one unit selected from among a fast ethernet interface unit providing fast ethernet networking functions, a standard ethernet interface unit providing standard ethernet networking functions, and an optical channel interface unit providing optical channel communication functions.

In accordance with the principles of the present invention, an interface module (such as module 103 shown in FIG. 3) can correspond to a storage device interface unit providing data storage functions, whereas the storage device interface unit can be coupled to a hard disk drive, a floppy disk drive, a removable hard disk drive, a compact disk-read only memory (CD-ROM), a digital versatile disk (DVD), a compact disk-recordable (CD-R), a compact disk-erasable (CD-E), a phase change disk (PCD), a phase disk (PD), or a tape drive, or a combination of the above.

In accordance with the principles of the present invention, an interface module (such as module 103 shown in FIG. 3) can correspond to an interface unit providing support and interfacing capabilities to a variety of peripheral devices. The variety of peripheral devices can include a printer, a keyboard, mouse, joystick, trackball, scanner, light pen, eyetracker control device, camera, microphone, or other peripheral which can be coupled to a computer system.

An interface module (such as module 102 or module 103 shown in FIG. 3) can be coupled to a peripheral device, as discussed above. However, the interface module is not required to be coupled to a peripheral device. The peripheral device, such as a hard disk drive, can be disconnected from the interface module. In addition, the interface module (such as module 102 or module 103 shown in FIG. 3) can be designed to include storage functions and other functions without requiring an external peripheral device to be coupled thereto.

Also, the network interface module 102 shown in FIG. 3 can be said to be dormant and inactive when it does not have any external peripheral devices connected to the I/O interface block 123. However, the present invention sets forth module 102 and does not require the external peripheral devices to be connected to I/O interface block 123. A user can choose to connect additional external peripheral devices to I/O interface block 123 but the user is not required to connect such additional external peripheral devices to I/O interface block 123.

The foregoing paragraphs describe an intelligent input and output controller for flexible interface. More specifically, the foregoing paragraphs describe a modified peripheral component interconnect (PCI) bus which modifies the function of the hardware by exchanging the interface modules when implementing the intelligent controller of the various input and output interfaces.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:

a control unit being coupled to a host computer system, said control unit controlling signals input to and output from said host computer system, said control unit further comprising:

a primary interface unit being coupled to said host computer system and performing primary input/output control operations;

a plurality of secondary interface units, each one of said secondary interface units being coupled to a respective peripheral unit selected from among a plurality of peripheral units and performing particular input/output control operations and additional control operations corresponding exclusively to said respective peripheral unit; and a Peripheral Component Interconnect bus unit coupling said primary interface unit with said plurality of secondary interface units;

said primary interface unit further comprising:

a central processing unit controlling said primary input/output control operations;

a host input/output bus interface unit being connected to said host computer system and to said central processing unit;

a modified interface unit being connected to said plurality of secondary interface units via said Peripheral Component Interconnect bus unit and being connected to said central processing unit; and an input/output controller implementing additional functions through said modified interface unit, said additional functions being input from a user.

2. The apparatus of claim 1, said central processing unit further comprising:

a processor controlling said primary input/output control operations;

a memory storing data and being connected to said processor;

an interrupt controller being connected to said processor; and a timer unit being connected to said processor.

3. The apparatus of claim 1, said plurality of secondary interface units being connected to said modified interface unit based on a piggy back pattern structure.

4. The apparatus of claim 1, said modified interface unit storing protocol specifications of a standard Peripheral Component Interconnect bus unit.

5. The apparatus of claim 1, said modified interface unit further comprising:

a bus interface unit, storing mechanical specifications of a piggy back pattern and protocol specifications of a standard Peripheral Component Interconnect bus, and including an additional signal line which can be modified by the user; and a connector coupling said bus interface unit and said plurality of secondary interface units.

6. The apparatus of claim 1, said input/output controller further comprising a plurality of programmable gate arrays for said implementing of said additional functions.

7. The apparatus of claim 1, said input/output controller implementing additional operations to said modified interface unit according to said plurality of peripheral units.

8. The apparatus of claim 1, each one of said plurality of secondary interface units further comprising:

a modified interface unit being coupled with said primary interface unit via said Peripheral Component Interconnect bus unit;

an input/output peripheral controller being connected to said modified interface unit; and a peripheral input/output interface unit being coupled with a particular peripheral unit selected from among said plurality of peripheral units and being connected to said input/output peripheral controller, said input/output peripheral controller controlling said particular peripheral unit.

9. The apparatus of claim 1, said control unit supporting a fast ethernet network when one of said plurality of secondary interface units corresponds to a fast ethernet interface unit and a pattern of said fast ethernet network is implemented in said control unit.

10. The apparatus of claim 1, said control unit supporting optical channels when one of said plurality of secondary interface units corresponds to an optical channel interface unit and a pattern of said optical channels is implemented in said control unit.

11. The apparatus of claim 1, said control unit supporting a storage device when one of said plurality of secondary interface units corresponds to a storage device interface unit and a pattern of said storage device is implemented in said control unit.

12. The apparatus of claim 1, said Peripheral Component Interconnect bus storing mechanical specifications of a piggy back pattern and protocol specifications of a standard Peripheral Component Interconnect bus, and including an additional signal line which can be modified by a user's definition.

13. The apparatus of claim 1, said modified interface unit being connected to said primary interface unit based on a piggy back pattern structure.

14. An apparatus, comprising:

a control unit being coupled to a host computer system, said control unit controlling signals input to and output from said host computer system, said control unit further comprising:

a primary interface unit being coupled to said host computer system and performing primary input/output control operations;

a plurality of secondary interface units including a first secondary interface unit, said first secondary interface unit being coupled to a first peripheral unit selected from among a plurality of peripheral units, said first secondary interface unit performing particular input/output control operations and additional control operations corresponding exclusively to said first peripheral unit; and a Peripheral Component Interconnect bus unit coupling said primary interface unit with said plurality of secondary interface units;

said primary interface unit further comprising:

a central processing unit controlling said primary input/output control operations;

a host input/output bus interface unit being connected to said host computer system and to said central processing unit;

a modified interface unit being connected to said plurality of secondary interface units via said Peripheral Component Interconnect bus unit and being connected to said central processing unit; and an input/output controller implementing additional functions through said modified interface unit, said additional functions being input from a user.

15. An apparatus, comprising:

a control unit being coupled to a host computer system, said control unit controlling signals input to and output from said host computer system, said control unit further comprising:

a primary interface unit being coupled to said host computer system and performing primary input/output control operations;

a first secondary interface unit performing first particular input/output control operations and first additional control operations, said first secondary interface unit being removably connected to at least one peripheral unit, said first particular input/output control operations and first additional control operations corresponding exclusively to said at least one peripheral unit; and a Peripheral Component Interconnect bus unit removably coupling said primary interface unit with said first secondary interface unit;

said primary interface unit further comprising:

a central processing unit controlling said primary input/output control operations;

a host input/output bus interface unit being connected to said host computer system and to said central processing unit;

a modified interface unit being removably connected to said first secondary interface unit via said Peripheral Component Interconnect bus unit and being connected to said central processing unit; and an input/output controller implementing additional functions through said modified interface unit, said additional functions being additionally input to said control unit.

16. The apparatus of claim 15, said modified interface unit further comprising:

a bus interface unit storing protocol specifications of a standard Peripheral Component Interconnect bus and including an additional signal line which can be modified by a user; and a connector removably coupling said bus interface unit and said first secondary interface unit.

17. The apparatus of claim 16, further comprising a second secondary interface unit performing second particular input/output control operations and second additional control operations, said second secondary interface unit being removably connected to at least one additional peripheral unit, said second particular input/output control operations and second additional control operations corresponding exclusively to said at least one additional peripheral unit.

18. The apparatus of claim 16, said first secondary interface unit corresponding to one selected from among a fast ethernet interface unit providing fast ethernet networking functions, a standard ethernet interface unit providing standard ethernet networking functions, an optical channel interface unit providing optical channel communication functions, and a storage device interface unit providing data storage functions.

19. An apparatus, comprising:
   a control unit being coupled to a host computer system, said control unit controlling signals input to and output from said host computer system, said control unit further comprising:
      a primary interface unit being coupled to said host computer system and performing primary input/output control operations;
      a plurality of secondary interface units, each one of said secondary interface units being coupled to a respective peripheral unit selected from among a plurality of peripheral units and performing particular input/output control operations and additional control operations corresponding exclusively to said respective peripheral unit; and
      a Peripheral Component Interconnect bus unit coupling said primary interface unit with said plurality of secondary interface units;
      at least one of said plurality of secondary interface units being connected to said primary interface unit based on a piggy back pattern structure.

20. The apparatus of claim 19, said primary interface unit further comprising:
   a central processing unit controlling said primary input/output control operations;
   a host input/output bus interface unit being connected to said host computer system and to said central processing unit;
   a modified interface unit being connected to said plurality of secondary interface units via said Peripheral Component Interconnect bus unit and being connected to said central processing unit; and
   an input/output controller implementing additional functions through said modified interface unit, said additional functions being input from a user.

21. The apparatus of claim 20, said modified interface unit further comprising:
   a bus interface unit, storing mechanical specifications of the piggy back pattern and protocol specifications of a standard Peripheral Component Interconnect bus, and including an additional signal line which can be modified by the user; and
   a connector coupling said bus interface unit and said plurality of secondary interface units.

* * * * *